United States Patent
Furukawa et al.

(10) Patent No.: US 11,795,823 B2
(45) Date of Patent: Oct. 24, 2023

(54) METHOD FOR DESIGNING VANE OF FAN, COMPRESSOR AND TURBINE OF AXIAL FLOW TYPE, AND VANE OBTAINED BY THE DESIGNING

(71) Applicant: IHI CORPORATION, Tokyo (JP)

(72) Inventors: Juo Furukawa, Tokyo (JP); Masaaki Hamabe, Tokyo (JP); Yasuhiro Okamura, Tokyo (JP); Daisuke Nishii, Tokyo (JP)

(73) Assignee: IHI CORPORATION, Tokyo (JP)

( * ) Notice: Subject to any disclaimer, the term of this patent is extended or adjusted under 35 U.S.C. 154(b) by 0 days.

(21) Appl. No.: 17/305,258

(22) Filed: Jul. 2, 2021

(65) Prior Publication Data

US 2021/0332704 A1 Oct. 28, 2021

Related U.S. Application Data

(63) Continuation of application No. PCT/JP2019/031210, filed on Aug. 7, 2019.

(30) Foreign Application Priority Data

Feb. 7, 2019 (JP) .................................. 2019-020912

(51) Int. Cl.
*F01D 5/14* (2006.01)
*F02C 7/00* (2006.01)
*F04D 29/38* (2006.01)

(52) U.S. Cl.
CPC ............... *F01D 5/141* (2013.01); *F02C 7/00* (2013.01); *F04D 29/384* (2013.01);
(Continued)

(58) Field of Classification Search
CPC ............................. F01D 5/141; F04D 29/384
See application file for complete search history.

(56) References Cited

U.S. PATENT DOCUMENTS

| 6,071,077 A | 6/2000 | Rowlands |
| 6,328,533 B1 | 12/2001 | Decker et al. |

(Continued)

FOREIGN PATENT DOCUMENTS

| JP | 05-026004 A | 2/1993 |
| JP | 8-93404 A | 4/1996 |

(Continued)

OTHER PUBLICATIONS

International Search Report dated Sep. 3, 2019 in PCT/JP2019/031210 filed on Aug. 7, 2019, 2 pages.

(Continued)

*Primary Examiner* — Michael L Sehn
(74) *Attorney, Agent, or Firm* — Oblon, McClelland, Maier & Neustadt, L.L.P.

(57) ABSTRACT

Provided are a method for designing a vane, which can reduce peaks of secondary flow losses appearing locally in secondary flow regions and a vane obtained by the designing. The method for designing a vane includes: a step of determining a base vane formed by stacking profiles having airfoil shapes in a spanwise direction along a stacking line which is configured as a smooth curved line having no inflection point or a straight line; and a step of changing the stacking line of the base vane to a smooth wavy curved line which waves in an axial direction of a fan, a compressor or a turbine and has no elbows.

12 Claims, 2 Drawing Sheets

(52) U.S. Cl.
CPC ...... *F05D 2230/00* (2013.01); *F05D 2240/30* (2013.01); *F05D 2240/303* (2013.01); *F05D 2240/304* (2013.01)

(56) References Cited

U.S. PATENT DOCUMENTS

| | | | |
|---|---|---|---|
| 8,083,487 B2 * | 12/2011 | Wood | F04D 29/324 416/223 R |
| 8,425,185 B2 * | 4/2013 | Myoren | F01D 5/141 416/DIG. 5 |
| 2009/0013532 A1 | 1/2009 | Wood et al. | |
| 2010/0215503 A1 | 8/2010 | Myoren et al. | |
| 2011/0182746 A1 | 7/2011 | Fiala et al. | |
| 2012/0076646 A1 | 3/2012 | Ono et al. | |
| 2013/0164488 A1 | 6/2013 | Wood et al. | |
| 2013/0266451 A1 | 10/2013 | Pesteil et al. | |
| 2016/0003095 A1 | 1/2016 | Romano et al. | |
| 2017/0226865 A1 | 8/2017 | Kray et al. | |
| 2018/0023397 A1 | 1/2018 | Vandeputte | |
| 2018/0023403 A1 | 1/2018 | Jones et al. | |

FOREIGN PATENT DOCUMENTS

| | | |
|---|---|---|
| JP | 08-31 2303 A | 11/1996 |
| JP | 11-117703 A | 4/1999 |
| JP | 2000-145402 A | 5/2000 |
| JP | 2001-214893 A | 8/2001 |
| JP | 2003-227302 A | 8/2003 |
| JP | 2009-013984 A | 1/2009 |
| JP | 2010-196563 A | 9/2010 |
| JP | 2012-092825 A | 5/2012 |
| JP | 2013-545936 A | 12/2013 |
| JP | 2015-503694 A | 2/2015 |
| JP | 5982498 B2 | 8/2016 |
| JP | 2017-187019 A | 10/2017 |

OTHER PUBLICATIONS

Shyam et al., "Application of Pinniped Vibrissae to Aeropropulsion", Proceedings of ASME Turbo Expo 2015, GT2015-43055, Jun. 2015, 10 pages.

Extended European Search Report issued in European Patent Application No. 19 91 4473 dated Oct. 21, 2022.

* cited by examiner

METHOD FOR DESIGNING VANE OF FAN, COMPRESSOR AND TURBINE OF AXIAL FLOW TYPE, AND VANE OBTAINED BY THE DESIGNING

TECHNICAL FIELD

The present disclosure relates to a method for designing a vane of a fan, a compressor and a turbine of an axial flow type for reducing secondary flow losses, and a vane obtained by the designing.

BACKGROUND ART

For example, a fan, a compressor and a turbine of an axial flow type, each of which is a component of a turbofan engine, includes one or more stages arrayed in an axial direction, and each of the stages is constituted of a rotor blade cascade formed by arranging rotor blades in a circumferential direction at equal intervals and a stator vane cascade formed by arranging stator vanes in a circumferential direction at equal intervals. Note that in each of the fan and the compressor, the rotor blade cascade is placed on an upstream side of the stage, and in the turbine, the stator vane cascade is placed on an upstream side of the stage.

A working fluid (air for the compressor and combustion gas for the turbine) which passes through the cascades (the rotor blade cascade and the stator vane cascade) flows through inter-vane flow passages, each of which is formed between neighboring vanes. In each of the inter-vane flow passages, an inner side in a radial direction is bounded by a flow passage inner wall, an outer side in the radial direction is bounded by a flow passage outer wall, and both sides in a circumferential direction are bounded by vane surfaces of neighboring vanes (a pressure surface and a suction surface). Note that in the rotor blade cascade, conventionally, a platform of the rotor blades constitutes the flow passage inner wall, and a casing (or a tip shroud provided at a tip of each of the rotor blades) constitutes the flow passage outer wall. In addition, in the stator vane cascade, conventionally, an inner band of each of the stator vanes constitutes the flow passage inner wall, and an outer band of each of the stator vanes constitutes the flow passage outer wall.

Note that in the present description, the term "vane" is used to show a vane portion (Aerofoil) of a part thereof, instead of showing the whole portion of each of the rotor blades or each of the stator vanes.

Incidentally, it is ideal that flows inside each of the inter-vane flow passages are along a solid wall which bounds the periphery of each of the inter-vane flow passages. Although flows in a portion which is away from the solid wall in each of the inter-vane flow passages (main flows) are flows which approximate the above-mentioned ideal flows, flows in the vicinity of the solid wall are different from the ideal flows due to influence of viscosity, that is, secondary flows are generated.

As a designing technique for reducing total pressure losses (secondary flow losses) which are caused by the above-mentioned secondary flows, for example, three-dimensional designing of vanes has been proposed (for example, refer to Patent Document 1).

The three-dimensional designing is a designing technique in which at least one of positions of a cross section of each of the vanes in a circumferential direction and an axial direction is changed in a spanwise direction (radial direction). Whereas a line (stacking line) connecting representative points of the cross section (for example, for the rotor blade, center of gravity and for the stator vane, leading edge or trailing edge) in positions in the spanwise direction is a straight line in the conventional two-dimensionally designed vane, a line (stacking line) connecting representative points in a three-dimensionally designed vane is a curved line which is curved in at least any one of a circumferential direction and an axial direction. Because of having the above-mentioned shape, in the three-dimensionally designed vane, new vortices are generated in an intended mode in flows in the inter-vane flow passages of the conventional two-dimensionally designed vane, thus suppressing the secondary flows.

RELATED ART DOCUMENT

Patent Document

Patent Document 1: Japanese Patent Application Laid-Open No. 5-26004

SUMMARY OF THE DISCLOSURE

Problems to be Solved by the Disclosure

There are many conventional three-dimensionally designed vanes, stacking lines of which have no inflection point (that is, a sign of curvature does not change) and are simple curved lines (for example, an arc or the like), and although there is effect to suppress the secondary flows at a macro level, effect to reduce peaks of secondary flow losses appearing locally in regions in which secondary flows are present, that is, secondary flow regions (regions in the vicinity of a hub portion (a radially inner portion) and a tip portion (a radially outer portion)) has not been exhibited.

In view of the above-described problem, the present disclosure has been made, and objects thereof are to provide a method for designing a vane of a fan, a compressor and a turbine of an axial flow type, which can reduce peaks of secondary flow losses appearing locally in the secondary flow regions, and a vane obtained by the designing.

Means for Solving the Problems

In order to solve the above-mentioned problem, a method for designing a vane of a fan, a compressor or a turbine of an axial flow type according to the present disclosure includes: a step of determining a base vane being formed by stacking profiles having airfoil shapes in a spanwise direction along a stacking line which is configured as a smooth curved line having no inflection point or a straight line; and a step of changing the stacking line of the base vane to a smooth wavy curved line which waves in an axial direction of the fan, the compressor or the turbine and has no elbows.

Effects of the Disclosure

According to the present disclosure, excellent effects that peaks of secondary flow losses appearing locally in secondary flow regions can be reduced can be obtained.

MODE FOR CARRYING OUT THE DISCLOSURE

Hereinafter, with reference to the accompanying drawings, an embodiment of the present disclosure will be described in detail.

Figure 1A:
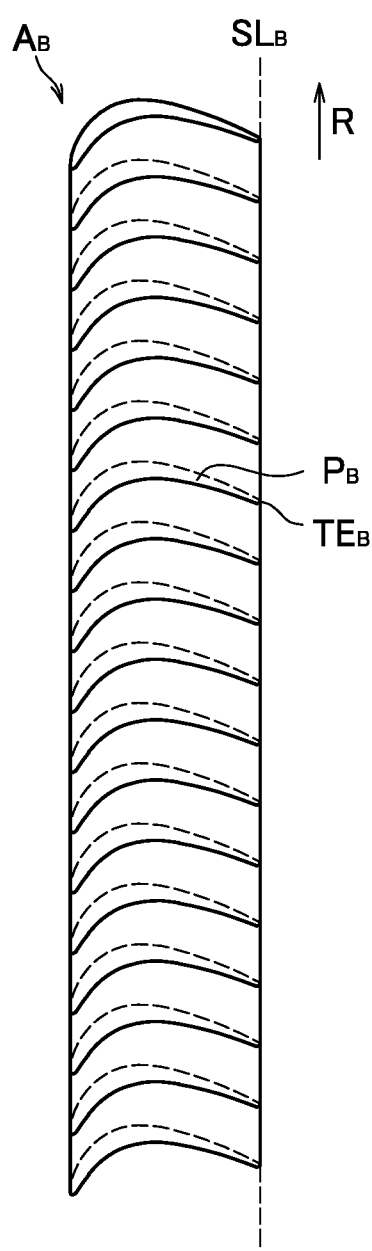
FIG. 1A is a diagram explaining a method for designing a vane of a fan, a compressor or a turbine of an axial flow type according to an embodiment of the present disclosure and illustrating an overall schematic perspective view of a vane which constitutes a base for designing by the method, that is a base vane.
Figure 1B:
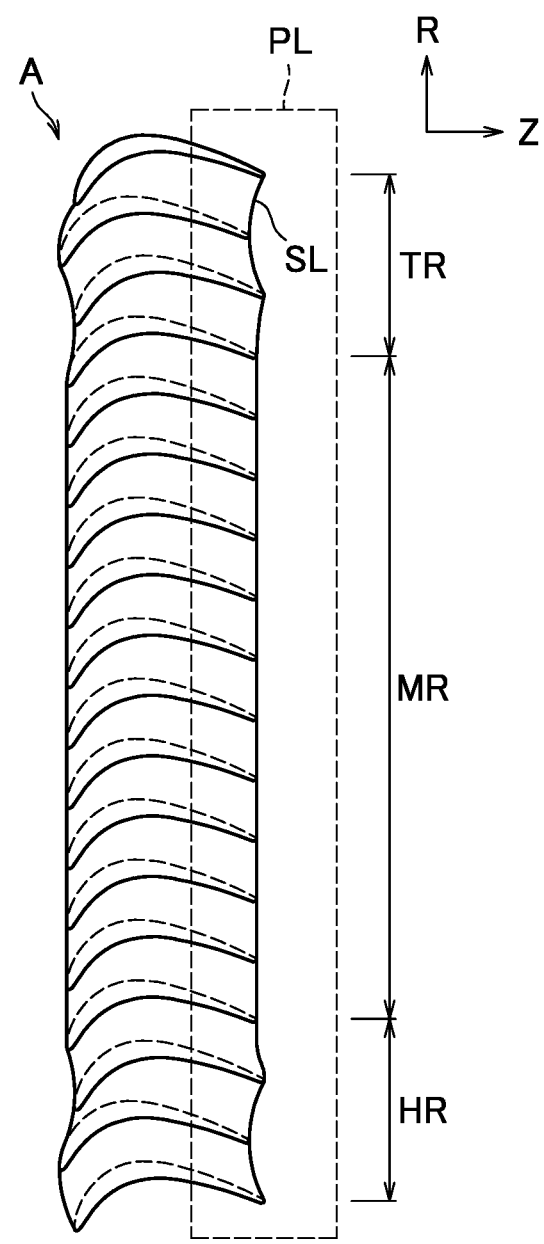
FIG. 1B is a diagram explaining the method for designing a vane of the fan, the compressor or the turbine of the axial flow type according to the embodiment of the present disclosure and illustrating an overall schematic perspective view of a vane designed by the method, that is, an improved vane.

FIG. 1A and FIG. 1B are diagrams explaining a method for designing a vane of a fan, a compressor or a turbine of an axial flow type according to the embodiment of the present disclosure. FIG. 1A is an overall schematic perspective view illustrating a vane which constitutes a base of designing by the method, that is, a base vane AB. FIG. 1B is an overall schematic perspective view illustrating a vane designed by the method, that is, an improved vane A.

In the method for designing a vane according to the embodiment of the present disclosure, in a first step, the base vane AB which is the base of the designing is determined.

Herein, a case in which as the base vane AB, a two-dimensionally designed stator vane is selected will be described. Note that the base vane AB may be a newly designed vane or may be the existing vane.

As shown in FIG. 1A, the base vane AB is formed by stacking up cross sections (each of these is referred to as a profile) PB, each of which is perpendicular to a radial direction R and has an airfoil shape, in a spanwise direction (longitudinal direction) (this is referred to as stacking).

In general, a mode of stacking is defined by a shape of a line connecting representative points of the profiles in spanwise positions (this is referred to as a stacking line), and as the representative points, conventionally, in a case of the stator vane, leading edges or trailing edges of the profiles are adopted, and in a case of a rotor blade, centers of gravity of the profiles are adopted.

Herein, a case in which a mode of stacking of the base vane AB which is the stator vane is defined by a shape of a stacking line connecting trailing edges TEB of the profiles PB in spanwise positions is assumed. In this case, as shown in FIG. 1A, a stacking line SLB of the base vane AB is a straight line which extends in the radial direction R.

Note that although the base vane AB is illustrated in such a way as to have shapes of the profiles PB in all spanwise positions, which are the same as one another, the base vane AB may be formed by stacking profiles whose shapes are different from one another, depending on the spanwise positions. In addition, although herein, it is assumed that the base vane AB is the two-dimensionally designed vane, the base vane AB may be a three-dimensionally designed vane.

In this case, a stacking line SLB of the base vane AB is a smooth curved line which is curved in at least one direction of a circumferential direction and an axial direction, instead of the straight line shown in FIG. 1A. Note that in this case, the curved line is assumed to have no inflection point (that is, a sign of curvature does not change).

In the method for designing a vane according to the embodiment of the present disclosure, in a next step, with the base vane AB in the above-described mode as a reference, by changing only a shape of the stacking line SLB, a vane according to the embodiment of the present disclosure, that is, the improved vane A can be obtained.

Specifically, as shown in FIG. 1B, although a part of a stacking line SL of the improved vane A in a mid-span region MR (region in the middle portion in the spanwise direction) remains as the straight line which extends in the radial direction R as with the stacking line SLB of the base vane AB, parts of the stacking line SL thereof in a hub region HR (region in the vicinity of a hub portion) and a tip region TR (region in the vicinity of a tip portion) are changed to curved lines which wave in the axial direction Z with the radial direction R as a reference.

More strictly speaking, the parts of the stacking line SL in the hub region HR and the tip region TR are wavy curved lines on a plane PL including a central axis (not illustrated) of the fan, the compressor or the turbine of the axial flow type, into which the improved vanes A are mounted. Here, the wavy curved lines are smooth curved lines each having no elbows and can be, for example, sinusoidal lines.

Note that in FIG. 1B, in order to facilitate understanding of features of shapes of the parts of the stacking line SL in the hub region HR and the tip region TR, shapes of the wavy curved lines which wave in the axial direction or specifically, pitches of waves (distances respectively between neighboring ridges in the spanwise direction or respectively between neighboring troughs in the spanwise direction) and amplitudes (distances in the axial direction respectively between neighboring ridges in the spanwise direction or respectively between neighboring troughs in the spanwise direction) are illustrated in an exaggerated manner.

As one example, a pitch P of each of the waves can be set so as to satisfy $P/Ct=0.67$ with a length of a line segment connecting a leading edge and a trailing edge of the profile (chord length) Ct as a reference and an amplitude A of each of the waves can be set so as to satisfy $A/C=0.0093$ with a length of a camber line of the profile (camber length) C as a reference.

In addition, the hub region HR and the tip region TR correspond to secondary flow regions in the vicinity of the hub portion and the tip portion and specifically, for example, can be made 0% to 20% span and 80% to 100% span, respectively. Here, the % span is obtained by dividing a height measured from the hub portion of the vane by an overall height of the vane (a height from the hub portion to the tip portion) to obtain a dimensionless value and expressing the dimensionless value as a percentage.

As described above, by making the stacking line SL the wavy curved line in the axial direction, a contour (a curved line connecting points at which pressures are equal to one another, that is, a constant pressure line) of a pressure distribution on a vane surface of the improved vane A in the hub region HR and the tip region TR becomes wavy in the axial direction. It can be said that in the axial positions on the vane surface, the distribution is, when a viewpoint is changed, a distribution in which parts where pressures are high and parts where pressures are low are alternately arranged in the spanwise direction.

The above-described pressure distribution is different from a pressure distribution of the base vane AB, and it is considered that separation of flows occurring locally in the hub region HR and the tip region TR is prevented and effect to reduce peaks of local secondary flow losses which are caused by the above-mentioned separation is exhibited.

Therefore, flows in the inter-vane flow passages of the vane cascades which are constituted of the base vanes AB and the improved vanes A were analyzed by using computational fluid dynamics (CFD). Note that the pitch P and the amplitude A of each of the waves of the stacking line SL of the improved vane A targeted for the analysis were set as illustrated above. Spanwise distributions of total pressure loss coefficients in the hub region HR and the tip region TR, which were obtained based on the results thereof, are shown in FIG. 2A and FIG. 2B.

Figure 2A:
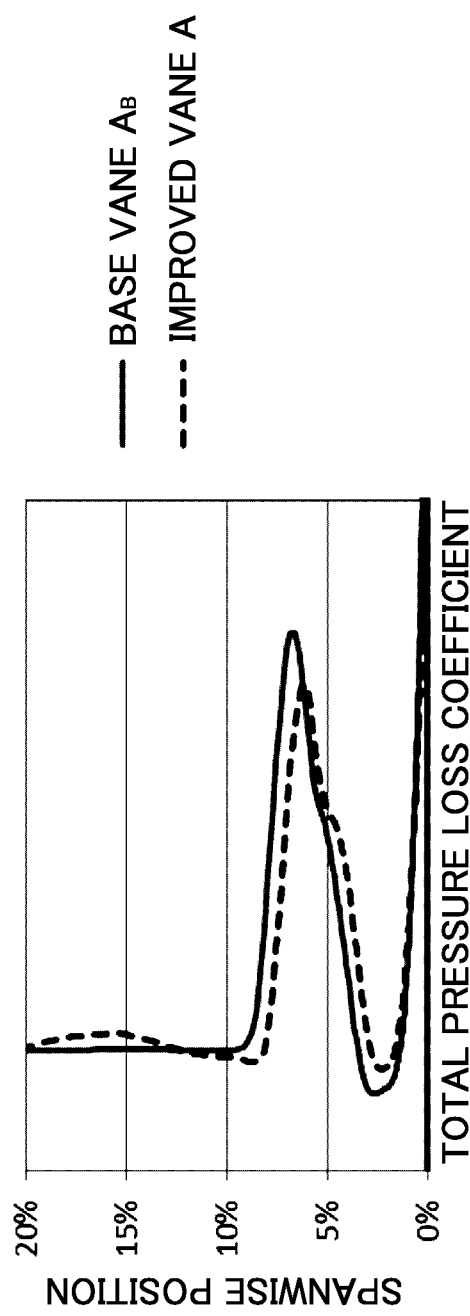
FIG. 2A is a graph showing spanwise distributions of total pressure loss coefficients in hub regions obtained based on a result of analyzing flows inside inter-vane flow passages of vane cascades which are configured respectively by base vanes and improved vanes.
Figure 2B:
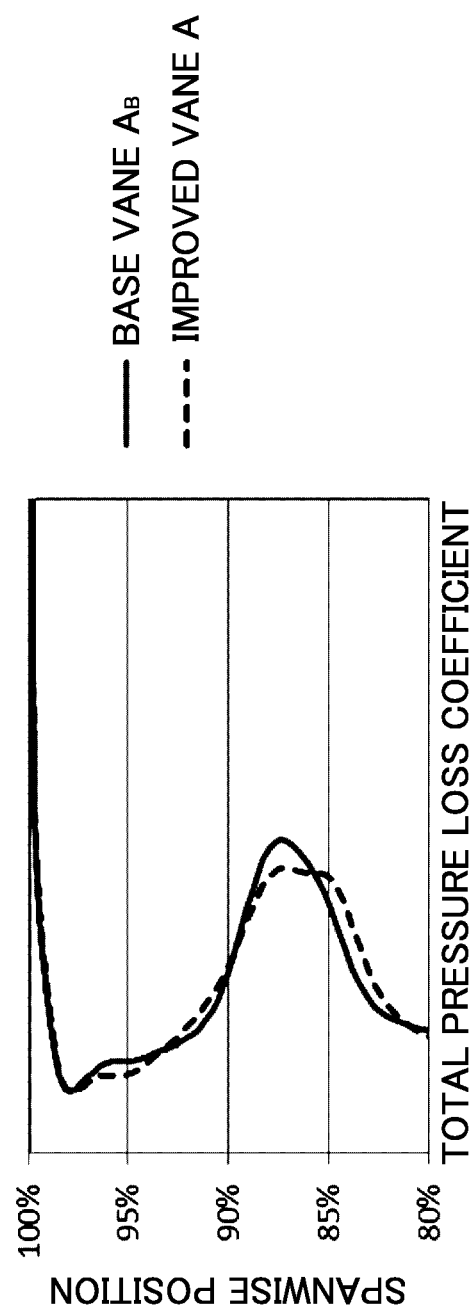
FIG. 2B is a graph showing spanwise distributions of total pressure loss coefficients in tip regions obtained based on a result of analyzing flows inside the inter-vane flow passages of the vane cascades which are configured respectively by the base vanes and the improved vanes.

As shown in FIG. 2A and FIG. 2B, although as to the base vane AB, in an approximately 6% to 7% span of the hub region HR and an approximately 87% to 88% span of the tip region TR, total pressure loss coefficients locally increase (in other words, peaks of secondary flow losses are locally present), as to the improved vane A, total pressure loss coefficients in the above-mentioned portions thereof decrease. A decrease amount of each of the total pressure loss coefficients was approximately 3.4%.

As described above, by employing the method for designing a vane according to the embodiment of the present disclosure, peaks of the secondary flow losses appearing locally in the secondary flow regions can be reduced.

Note that although hereinbefore, a case where the stacking line SL is changed to the wavy curved line which waves in the axial direction only in the hub region HR and the tip region TR is described, the stacking line SL may be changed to the wavy curved line, which waves in the axial direction, over the whole region in the spanwise direction, which includes the mid-span region MR. Also in this case, it is considered that there is a case where by preventing separation of a flow, which occurs locally in the mid-span region MR, a total pressure loss coefficient is reduced.

In addition, the shapes of the wavy curved lines which wave in the axial direction or specifically, the pitches of the waves (the distances respectively between the neighboring ridges in the spanwise direction or respectively between the neighboring troughs in the spanwise direction) and the amplitudes (the distances in the axial direction respectively between the neighboring ridges in the spanwise direction or respectively between the neighboring troughs in the spanwise direction) can be appropriately selected so as to allow the separation of the flows occurring locally in the hub region HR and the tip region TR (as well as the mid-span region MR) to be prevented in consideration of patterns of the secondary flows (or main flows) in these regions. In this case, the shapes of the wavy curved lines in the hub region HR, the mid-span region MR and the tip region TR can be different from one another.

Here, when the method for designing a vane according to the embodiment of the present disclosure described hereinbefore is organized, the method is constituted of the following steps.

(1) The base vane AB which constitutes the base of designing is determined. Here, the base vane AB is formed by stacking the profiles PB having the airfoil shapes in the spanwise direction along the stacking line SLB which is configured as the smooth curved line having no inflection point or the straight line.

(2) By changing the stacking line SLB of the base vane AB to the smooth wavy curved line which waves in the axial direction and has no elbows, the improved vane A is obtained. At this time, the curved line having undergone the change is the stacking line SL of the improved vane A.

In addition, when the shape of the vane (improved vane A) according to the embodiment of the present disclosure is organized, the following results.

The improved vane A can be obtained by improving the base vane AB.

The base vane AB is formed by stacking the profiles PB having the airfoil shapes in the spanwise direction along the stacking line SLB which is configured as the smooth curved line having no inflection point or the straight line.

For the vane (improved vane A), the stacking line SLB of the base vane AB is changed to the smooth wavy curved line which waves in the axial direction and has no elbows. At this time, the curved line having undergone the change is the stacking line SL of the improved vane A.

(Aspects of the Present Disclosure)

A method for designing a vane of a fan, a compressor or a turbine of an axial flow type according to a first aspect of the present disclosure includes: a step of determining a base vane being formed by stacking profiles having airfoil shapes in a spanwise direction along a stacking line which is configured as a smooth curved line having no inflection point or a straight line; and a step of changing the stacking line of the base vane to a smooth wavy curved line which waves in an axial direction of the fan, the compressor or the turbine and has no elbows.

In the method for designing a vane of the fan, the compressor or the turbine of the axial flow type according to a second aspect of the present disclosure, the stacking line of the base vane is a line connecting any of leading edges, trailing edges or centers of gravity of the profiles in each spanwise position.

In the method for designing a vane of the fan, the compressor or the turbine of the axial flow type according to a third aspect of the present disclosure, the stacking line of the base vane is changed to the wavy curved line only in at least one of a hub region and a tip region of the base vane.

In the method for designing a vane of the fan, the compressor or the turbine of the axial flow type according to a fourth aspect of the present disclosure, when positions in the spanwise direction are expressed as a percentage of a height measured from the hub portion of the base vane to an overall height of the base vane, the hub region is in a range of 0% to 20% span and the tip region is in a range of 80% to 100% span.

A vane of a fan, a compressor or a turbine of an axial flow type according to a first aspect of the present disclosure is obtained by improving a base vane, the base vane is formed by stacking profiles having airfoil shapes in a spanwise direction along a stacking line which is configured as a smooth curved line having no inflection point or a straight line, and the vane is obtained by changing the stacking line of the base vane to a smooth wavy curved line which waves in an axial direction of the fan, the compressor or the turbine and has no elbows.

In the vane of the fan, the compressor or the turbine of the axial flow type according to a second aspect of the present disclosure, the stacking line of the base vane is a line connecting any of leading edges, trailing edges or centers of gravity of the profiles in each spanwise position.

In the vane of the fan, the compressor or the turbine of the axial flow type according to a third aspect of the present disclosure, the stacking line of the base vane is changed to the wavy curved line only in at least one of a hub region and a tip region of the base vane.

In the vane of the fan, the compressor or the turbine of the axial flow type according to a fourth aspect of the present disclosure, when positions in the spanwise direction are expressed as a percentage of a height measured from the hub portion of the base vane to an overall height of the base vane, the hub region is in a range of 0% to 20% span and the tip region is in a range of 80% to 100% span.

EXPLANATION OF REFERENCE SIGNS

A Vane (Improved vane)
$A_B$ Base vane
$P_B$ Profile (of the base vane)
$SL_B$ Stacking line (of the base vane)

The invention claimed is:

1. A method for designing a vane of a fan, a compressor or a turbine of an axial flow type, the method comprising:
   determining a base vane being formed by stacking profiles having airfoil shapes in a spanwise direction along a stacking line which is configured as a smooth curved line having no inflection point or a straight line; and
   changing the stacking line of the base vane to a smooth wavy curved line which waves solely in an axial direction on a plane including a central axis of the fan, the compressor or the turbine, and a straight line extending in a radial direction; and which has no elbows.

2. The method according to claim 1, wherein the stacking line of the base vane is a line connecting any of leading edges, trailing edges or centers of gravity of the profiles in each spanwise position.

3. The method according to claim 1, wherein the stacking line of the base vane is changed to the wavy curved line only in at least one of a hub region and a tip region of the base vane.

4. The method according to claim 3, wherein when positions in the spanwise direction are expressed as a percentage of a height measured from a hub portion of the base vane to an overall height of the base vane, the hub region is in a range of 0% to 20% span and the tip region is in a range of 80% to 100% span.

5. The method according to claim 1, wherein a pitch of each wave of the smooth wavy curved line satisfies $P/Ct=0.67$, in which P is the pitch of the wave and Ct is a length of a line segment connecting a leading edge and a trailing edge of the profile.

6. The method according to claim 1, wherein an amplitude of each wave of the smooth wavy curved line satisfies $A/C=0.0093$, in which A is the amplitude of the wave and C is a length of a camber line of the profile.

7. A vane of a fan, a compressor or a turbine of an axial flow type, the vane being obtained by improving a base vane, wherein the base vane is formed by stacking profiles having airfoil shapes in a spanwise direction along a stacking line which is configured as a smooth curved line having no inflection point or a straight line, and
   the vane is obtained by changing the stacking line of the base vane to a smooth wavy curved line which waves solely in an axial direction on a plane including a central axis of the fan, the compressor or the turbine, and a straight line extending in a radial direction; and which has no elbows.

8. The vane according to claim 7, wherein the stacking line of the base vane is a line connecting any of leading edges, trailing edges or centers of gravity of the profiles in each spanwise position.

9. The vane according to claim 7, wherein the stacking line of the base vane is changed to the wavy curved line only in at least one of a hub region and a tip region of the base vane.

10. The vane according to claim 9, wherein when positions in the spanwise direction are expressed as a percentage of a height measured from a hub portion of the base vane to an overall height of the base vane, the hub region is in a range of 0% to 20% span and the tip region is in a range of 80% to 100% span.

11. The vane according to claim 7, wherein a pitch of each wave of the smooth wavy curved line satisfies $P/Ct=0.67$, in which P is the pitch of the wave and Ct is a length of a line segment connecting a leading edge and a trailing edge of the profile.

12. The vane according to claim 7, wherein an amplitude of each wave of the smooth wavy curved line satisfies $A/C=0.0093$, in which A is the amplitude of the wave and C is a length of a camber line of the profile.

* * * * *